(12) United States Patent
Woodruff et al.

(10) Patent No.: US 11,061,192 B2
(45) Date of Patent: Jul. 13, 2021

(54) MULTI-CHANNEL FIBER OPTIC CABLE CONNECTOR

(71) Applicant: Amphenol Corporation, Wallingford, CT (US)

(72) Inventors: Jon M. Woodruff, Allen, TX (US);
Sean M. McCalley, Allen, TX (US);
Michael L. Cox, Murphy, TX (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 16/584,475

(22) Filed: Sep. 26, 2019

(65) Prior Publication Data

US 2020/0103602 A1 Apr. 2, 2020

Related U.S. Application Data

(60) Provisional application No. 62/737,598, filed on Sep. 27, 2018.

(51) Int. Cl.
*G02B 6/38* (2006.01)
*G02B 6/44* (2006.01)

(52) U.S. Cl.
CPC ......... *G02B 6/3885* (2013.01); *G02B 6/3839* (2013.01); *G02B 6/3887* (2013.01); *G02B 6/4471* (2013.01)

(58) Field of Classification Search
None
See application file for complete search history.

(56) References Cited

U.S. PATENT DOCUMENTS

| | | | | |
|---|---|---|---|---|
| 3,999,837 A | * | 12/1976 | Bowen | G02B 6/3825 385/54 |
| 4,056,305 A | * | 11/1977 | McCartney | G02B 6/3809 385/64 |
| 5,096,276 A | * | 3/1992 | Gerace | G02B 6/3831 385/76 |
| 6,305,849 B1 | | 10/2001 | Roehrs et al. | |
| 2002/0097964 A1 | * | 7/2002 | Roehrs | G02B 6/3878 385/59 |
| 2014/0153876 A1 | | 6/2014 | Dendas et al. | |

OTHER PUBLICATIONS

European Search Report for EP Application No. EP19199904, dated Nov. 5, 2019, 9 pages.

* cited by examiner

*Primary Examiner* — Omar R Rojas
(74) *Attorney, Agent, or Firm* — Blank Rome LLP

(57) ABSTRACT

A fiber optic cable connector for connecting the terminal ends of two fiber optic cables having termini of respective ones of multiple optical fibers included within said cables. The connector has a termini with a pin body that includes a flat alignment surface at the rear of the main body. The pin body is received in a bore of an insert body. The forward face of the insert body has a shoulder that partially obstructs the bore and aligns with the flat alignment surfaces of the pin body. The shoulder and flat alignment surface cooperate to ensure that the termini is properly inserted into the bore so that an angled forward contact surface of the termini is properly aligned with the angled forward contact surface of a mating termini of another connector.

21 Claims, 6 Drawing Sheets

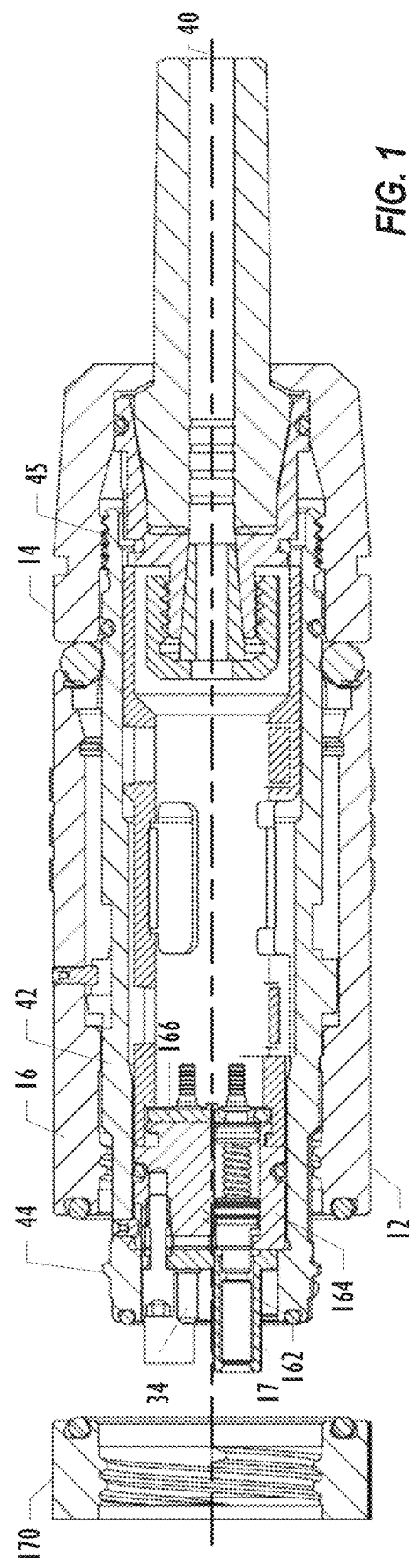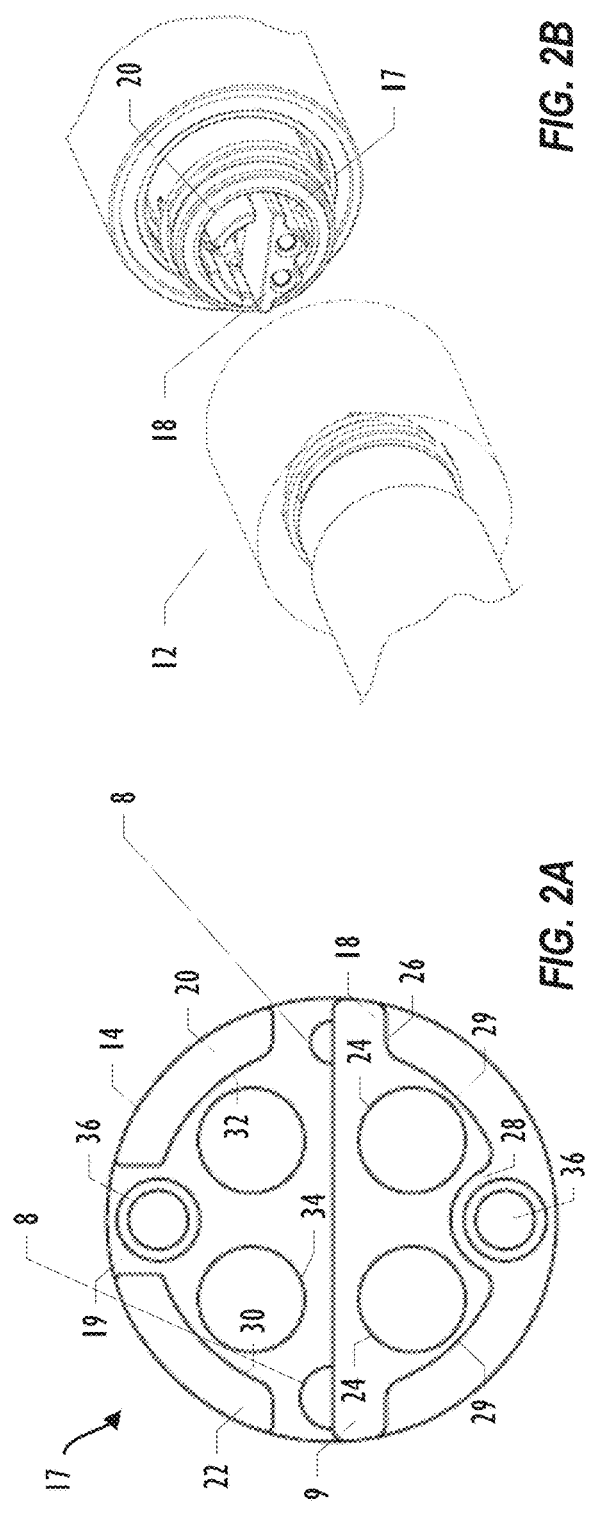
FIG. 1
FIG. 2A
FIG. 2B

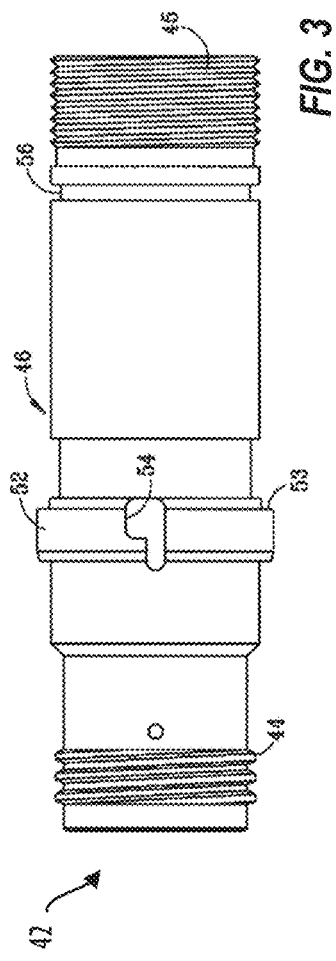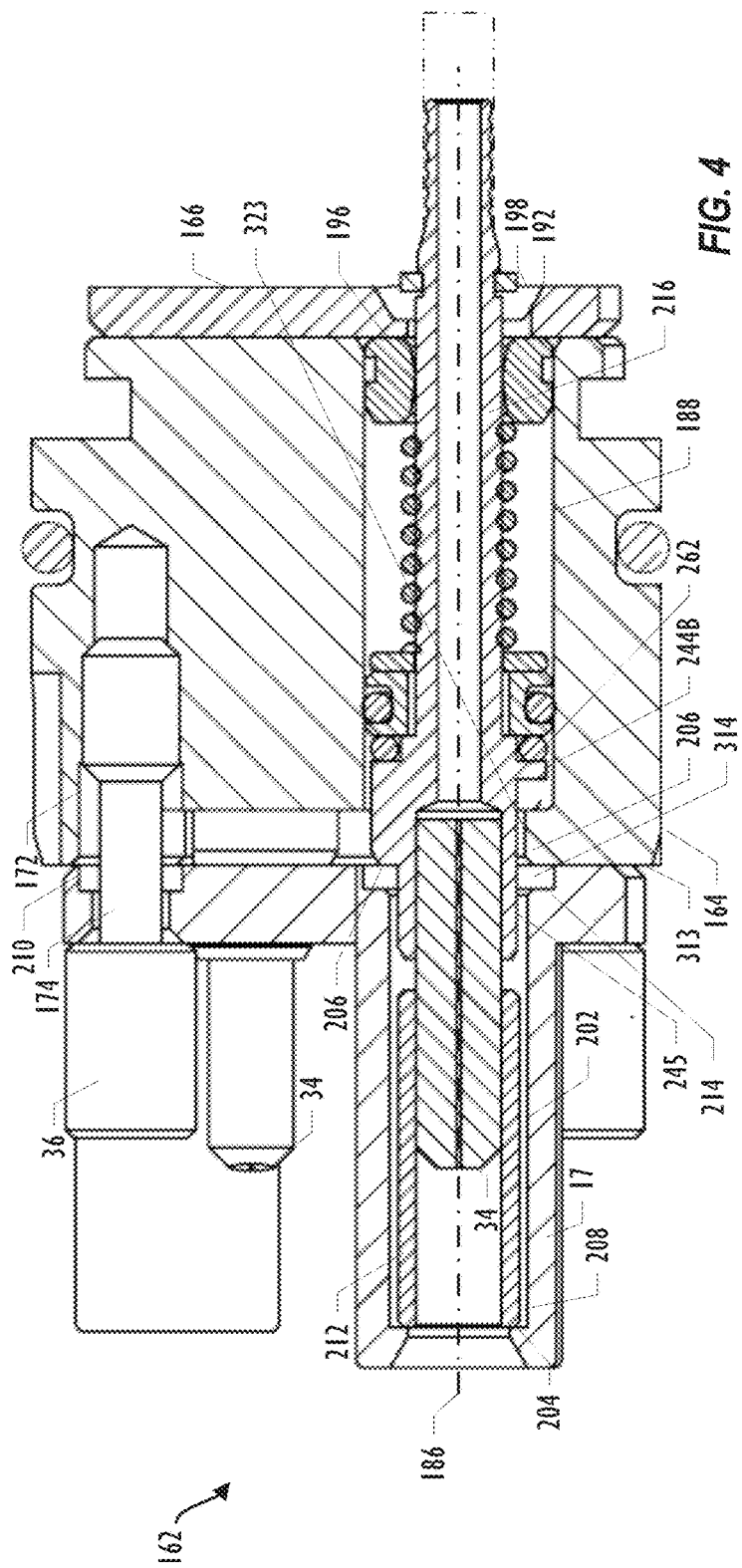

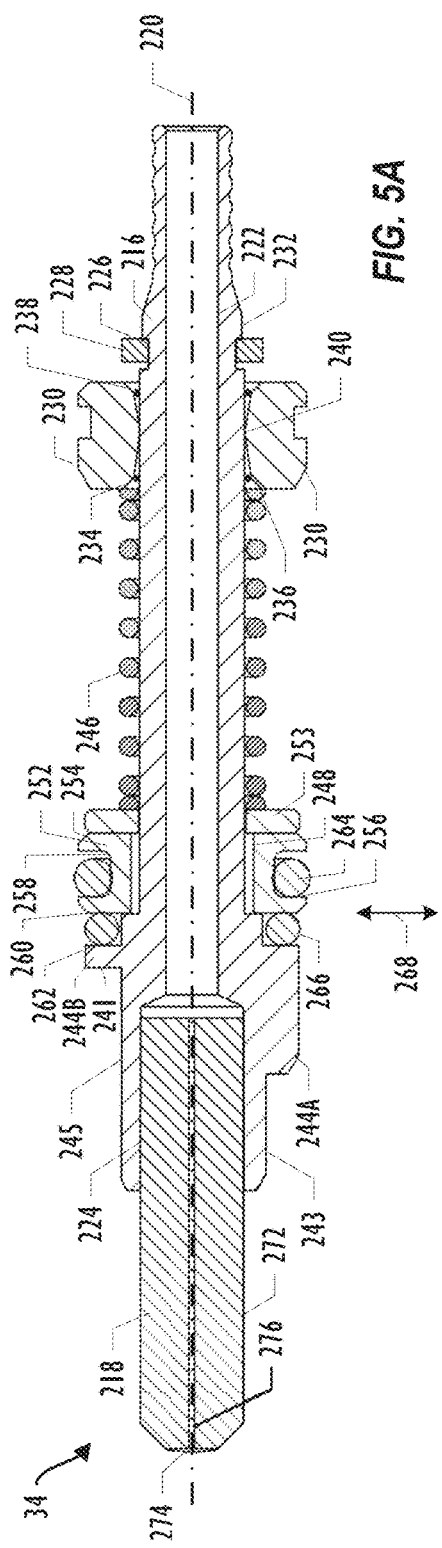
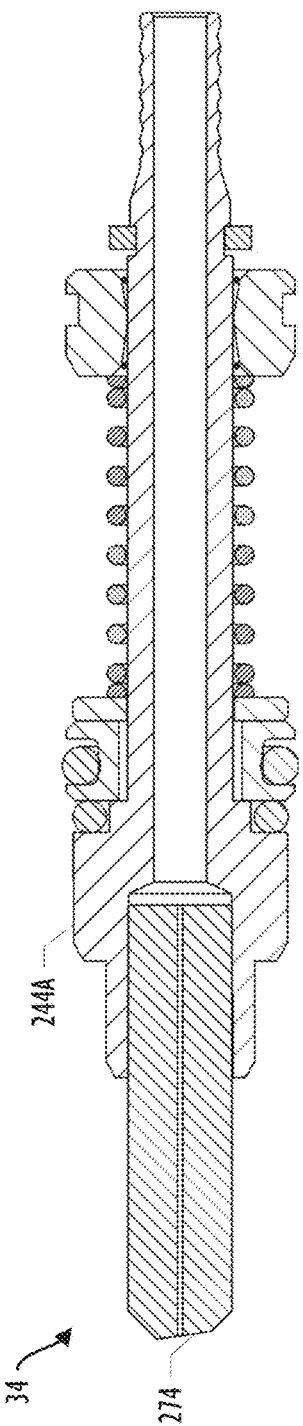
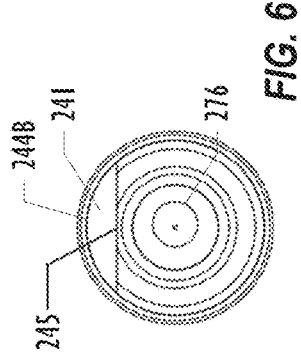

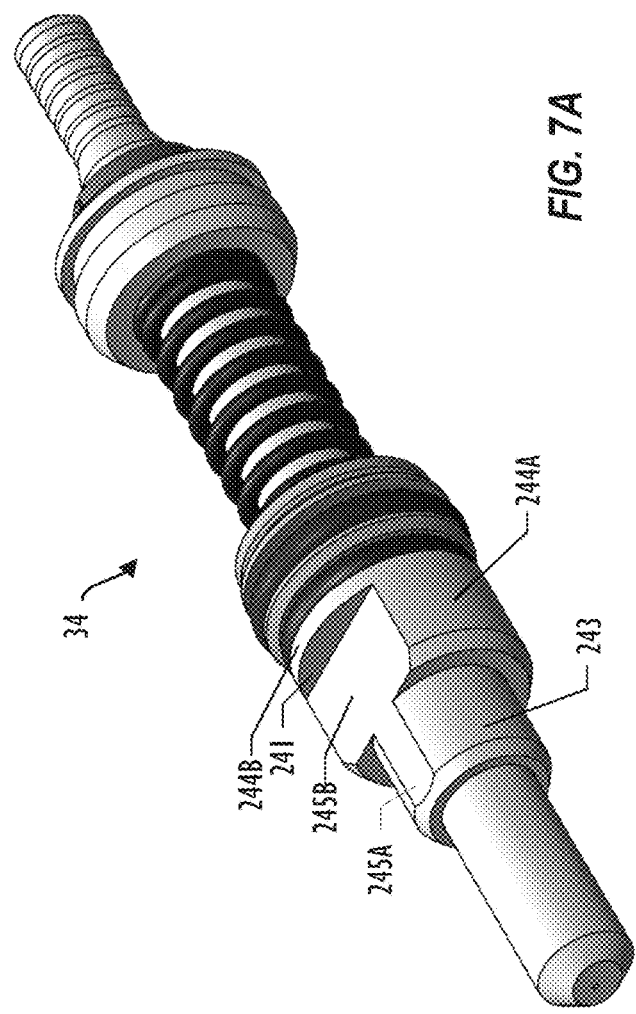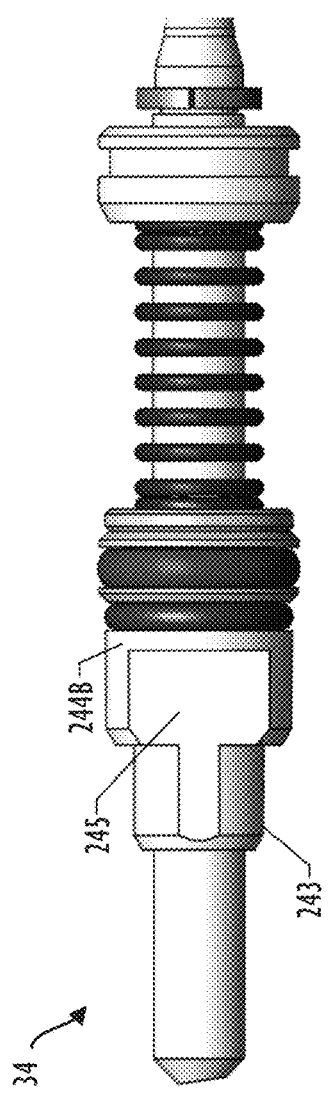

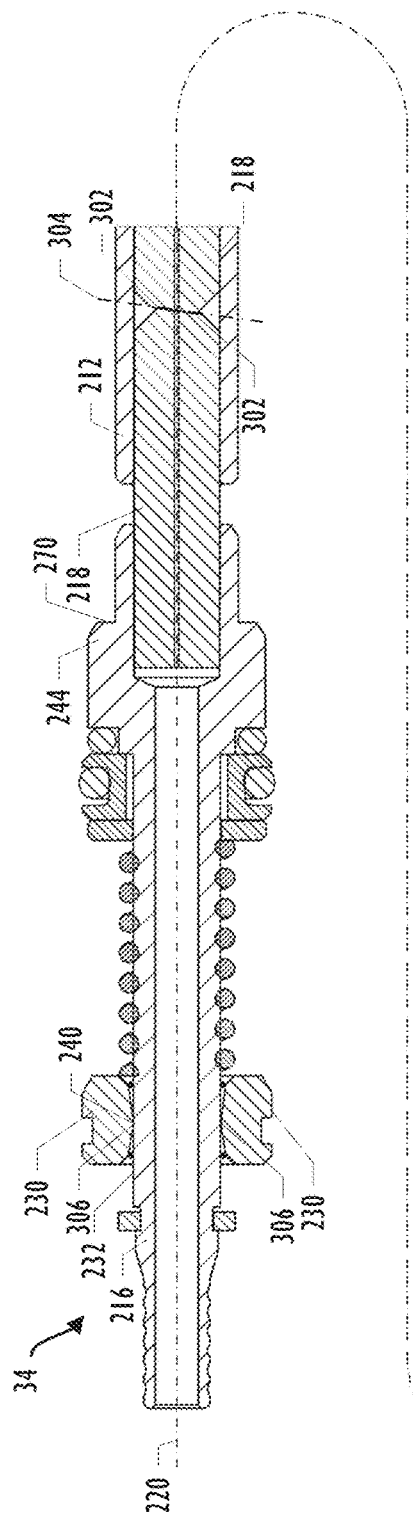
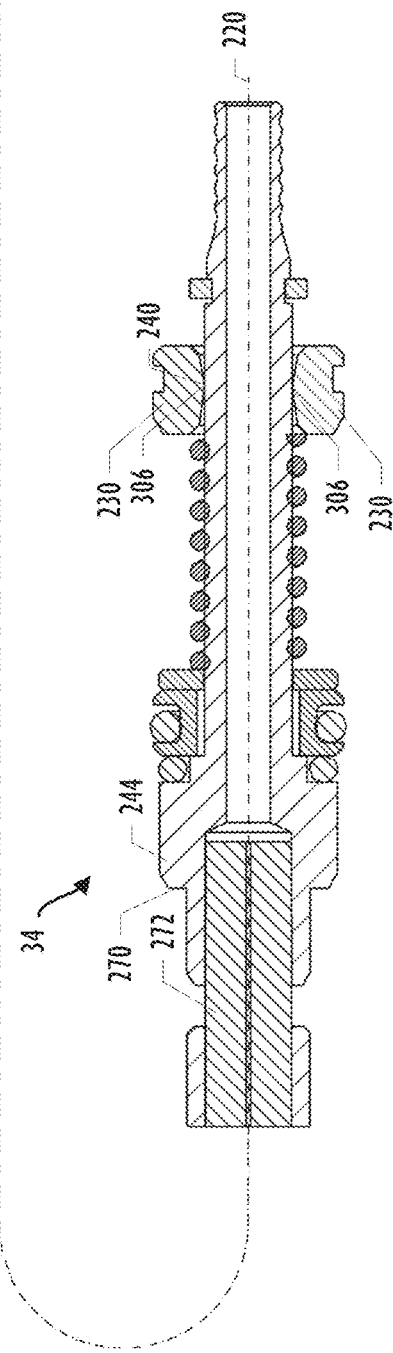
FIG. 8
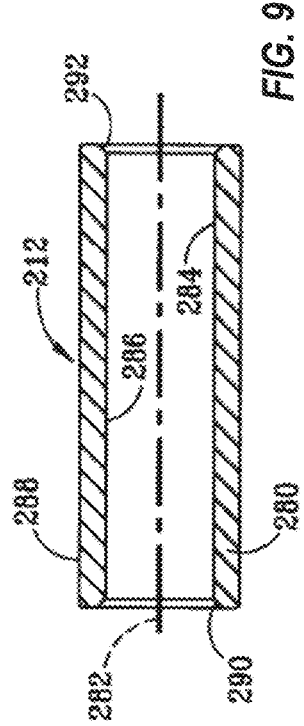
FIG. 9

MULTI-CHANNEL FIBER OPTIC CABLE CONNECTOR

RELATED APPLICATIONS

This application claims priority to U.S. Provisional Application No. 62/737,598, filed Sep. 27, 2018, which is hereby incorporated by reference.

BACKGROUND

The present disclosure relates to optical fiber light transmission systems, and in particular to connectors for coupling optical fiber conductors. One such multi-channel fiber optic connector is shown, for example, in U.S. Pat. No. 6,305,849 to Roehrs et al., the entire content of which is hereby incorporated by reference.

Prior art fiber optic cable connectors have been provided for joining cables which contain optical fibers. The cables are coupled so that the optical fibers of the different cables are aligned for transmitting light signals between the cables. In some applications, the cable connectors are coupled and decoupled numerous times for temporary installations, and may also be exposed to contaminants such as moisture, dust, smoke and fumes. Such fiber optic connectors and cables have been provided for single-channel applications, in which only a single conductor fiber is coupled from each of mating cables, and multi-channel applications, in which each of the cables contains multiple conductor fibers which are coupled by mating connectors.

Terminal ends of the optical fibers contained in such cables are included within termini. The termini typically include ferrules which extend over the terminal ends of the fibers and which are aligned to align the mating faces of the respective optical fibers being joined. The terminal end portions of the optical fibers pass through the ferrules, and usually fit flush with terminal ends of the ferrules. When two of the cables are coupled together, opposing ferrules are mated together in an abutting arrangement, with the terminal ends of the optical fibers coaxially aligned for transmitting light signals therebetween. The precise alignment between two of the mating ferrules helps reduce transmission losses which occur due to diffusion and reflection of the light being transmitted from one optical fiber to another.

In some single channel and multi-channel applications, light signals have been transmitted between opposing optical fibers using expanded beam type termini connections, in which the light signal from a first one of the optical fibers is expanded, or spread apart, and then collimated upon exiting a terminal end of a first one of the mating termini, and then is received and collected by a second one of the termini to focus the light signal into a second one of the optical fibers. Expanded beam type termini connectors can encounter losses in excess of 3 db, which is unacceptable in some fiber optic applications.

The ferrules of the expanded beam type optical fiber termini typically are coupled utilizing split sleeves. The split sleeves are each split along one side by a slot that runs the full longitudinal lengths of respective ones of the sleeves, typically parallel to the lengths of the optical fibers, so that the sleeve acts like a resilient, spring-like member to clamp down upon the exterior of the ferrules to align the two mating ferrules. The two mating termini are usually gimbaled at points which are spaced apart from the terminal ends thereof, such that the terminal ends of the termini are free to angularly move along arcuate paths which extend transversely to the longitudinal length of the sleeve and the light path. This allows the terminal ends of the termini, that is, the axes of the termini, and the optical fibers to be coaxially aligned when being fitted within the split sleeve. O-ring seals have been included to prevent contamination of the terminal ends surfaces of the termini. In some prior art connectors, O-ring seals have been used to seal against the respective ones of the termini, and also to simultaneously provide gimbal surfaces for allowing angular alignment of the axes of the termini, such that the terminal ends of the termini are aligned in parallel.

Connection of male and female fiber optic cables in the field requires that the connecting fiber optic cables be arranged such that respective male and female connector ends of the cables are aligned for mating. The termini in the connectors are usually designated pin or socket, and can be fitted with springs on one or both. The distinguishing feature between a pin and a socket is that an outer alignment sleeve is associated with the socket and remains associated with the socket during normal mate and demate of the connectors, in which a pin termini engages within a socket termini. The male and female connectors typically have a respective pin termini or socket termini, and the connectors are connected to opposite ends of the fiber optic cables.

Longer fiber optic cables may be used to avoid higher transmission losses associated with connections between the cables by requiring fewer cable connections. If one of the longer cables has been laid out in the wrong orientation for connecting to an adjacent cable, then that one of the cables has to be gathered and then laid out a second time or a special female-to-female or male-to-male connector adapter is required to join two adjacent ends of the cables. Additional handling of connector ends can result in contamination of the termini, and use of special connector adapters results in additional line losses from the added fiber optic connections.

To overcome this problem, hermaphroditic fiber optic cable connectors have been used to provide identical cable ends which may be mated together, such that either end of a first cable may be connected to either end of a second cable. Hermaphroditic connectors allow the fiber optic cables to be laid out without regard to the orientation of the cables, and also reduce line losses by not requiring special cable adapters for different cable ends. However, the termini in such connectors still typically remain either pin or socket termini, that is, with an outer alignment sleeve associated with one or the other.

SUMMARY

A fiber optic cable connector for a terminal end of a fiber optic cable having at least one optical fiber, the connector comprising a termini receiving the optical fiber, said termini having a body with an exterior surface; an insert body with an interior passage disposed therein for receiving the termini of the optical fiber of one of said cables; a first alignment plane of said termini for aligning with a second alignment plane of another at least one optical fiber of another termini for transmitting light signals therebetween; and a shoulder disposed at said interior passage of said insert body and extending inward transverse to a longitudinal axes of said interior passage for retaining said termini within said passage with said termini aligned with the first alignment plane, said shoulder engaging with the exterior surface of said termini.

A method for joining two fiber optic cables having termini of respective ones of multiple optical fibers included within said cables, the method comprising receiving at a housing having an insert body with an interior passage disposed therein, one of the termini of the optical fibers of one of the cables; aligning at a first at least one alignment plane with a second at least one alignment plane of a second housing for transmitting light signals therebetween; retaining at shoulder disposed to extend substantially transverse to a longitudinal axes of the interior passage, the termini within the interior passage, the termini having a flat surface; and mating ones of said termini fit within opposite ends of respective ones of a mating sleeve to align said terminal ends of said mating ones of said termini for transmitting light signals therebetween.

BRIEF DESCRIPTION OF THE DRAWINGS

For a detailed description of various examples, reference will now be made to the accompanying drawings in which:

FIG. 1 is a longitudinal sectional view of one of the connectors, in accordance with aspects of the present disclosure.

FIG. 2A is a forward view of an insert cap made according to the present disclosure.

FIG. 2B is a perspective view of the hermaphroditic fiber optic cable coupling.

FIG. 3 is a top view of the main body sleeve, in accordance with aspects of the present disclosure.

FIG. 4 is a longitudinal section view of the insert assembly, in accordance with aspects of the present disclosure.

FIG. 5A is a longitudinal section view of one of the termini, in accordance with aspects of the present disclosure.

FIG. 5B is a longitudinal section view of the termini rotated 90 degrees, in accordance with aspects of the present disclosure.

FIG. 6 is a forward view of the termini, in accordance with aspects of the present disclosure.

FIG. 7A is a perspective view of the termini, in accordance with aspects of the present disclosure.

FIG. 7B is a is a longitudinal view of the termini, in accordance with aspects of the present disclosure.

FIG. 8 is a longitudinal section view of two of the termini, in accordance with aspects of the present disclosure.

FIG. 9 is a longitudinal section view of the alignment sleeve 212, in accordance with aspects of the present disclosure.

DETAILED DESCRIPTION

Figure 10:
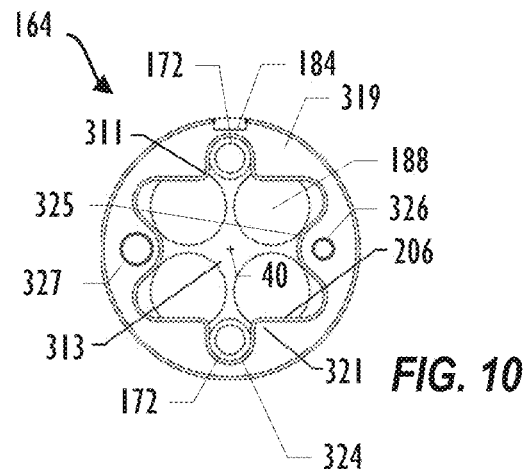
FIG. 10 is a perspective view of a forward-end of the terminus insert body 164, in accordance with aspects of the present disclosure.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

FIG. 1 is a longitudinal sectional view of a connector 12 in accordance with aspects of the present disclosure. The connector 12 generally includes an outer housing 14, inner sleeve 42, and an insert assembly 162. The connector 12 is elongated and defines a longitudinal axis 40.

The connector housing 14 at least partly encloses a sleeve 42, each of which has a cylindrical shape that is coaxially disposed with the longitudinal axis 40. The sleeve 42 has threaded ends 44 and 45 for threadingly engaging the coupling sleeve 16 of a mating connector 12, and an end cap, respectively. The sleeve 42 has an exterior periphery 46 and an interior bore 48 which define two respective profiles for mating and coupling with other components of the connector 12. The sleeve 42 has an annular-shaped shoulder 50 which is interiorly disposed to extend within the interior bore 48, transverse to the longitudinal axis 40.

The insert assembly 162 is provided in the forward end of the connector 12. The connector housing 14 at least partially encloses the insert assembly 162. Referring to FIGS. 1, 4, the insert assembly 162 includes an insert body 164 and an insert cap 17. A dust cap 170 or plug can be provided for threadingly securing to the threaded end 44 of the sleeve 42. Each of the insert body 164 and the insert cap 17 have a leading end and a trailing or rear end. The rear end of the insert cap 17 connects with the leading end of the insert body 164. A termini 34 has a termini or pin body 216 with a leading end that receives a ferrule 218, a rear end, and an intermediate portion therebetween. The leading end of the pin body 216 is received in the insert cap 17 and at least the intermediate portion is received in the insert body 164.

FIG. 2A is a forward view of the insert cap 17, and FIG. 2B is a perspective view of two fiber optic connectors 12 showing the insert cap 17. The fiber optic connector 12 at can be coupled to an end of a fiber optic cable and two fiber optic cables may be mated together using a pair of the fiber optic connectors 12. In one embodiment of the disclosure, the fiber optic connectors 12 are hermaphroditic in that the mating connectors 12 are exact duplicates of one another, and the two identical connectors 12 mate with one another. Each of the fiber optic connectors 12 includes a connector housing 14. The coupling sleeves 16 of the connectors 12 are threadingly secured to the connector housings 14 of the connectors 12 and may be adjusted to make one of the mating connectors 12 correspond to a male connector and the other of the connectors 12 correspond to a female connector to dispose one in a male mode and the other in a female mode, respectively.

The insert cap 17 is provided at the leading end of the connector housing 14 of respective ones of the connectors 12. As shown in FIG. 2, the insert cap 17 has three protuberant portions which extend from a recessed face 19 of the insert cap, namely a tower frame 18 and one or more tangs, here shown as a first tang 20 and a second tang 22.

The three protuberant portions 18, 20 and 22 are arranged in an interlocking alignment with respective portions of a mating connector 12. For example, the two tangs 20, 22 are disposed in a keyed arrangement relative to the tower frame 18 to fit on opposite sides of the tower frame 18 of the insert cap 17 of the mating connector 12. The tangs 20, 22 and termini 34 are disposed on a first half of the recessed face 19, shown as the upper half in the embodiment of FIG. 2A. And the tower frame 18 and apertures 24 are disposed on a second half of the recessed face 19, shown as the lower half in the embodiment of FIG. 2A.

The tower frame 18 contains two apertures 24 for passing optical fibers, and a periphery 26 which defines a recess 28 and exteriorly disposed side profiles 29. The tower frame 18 includes a linear portion that has a flat linear section of the outer periphery 26, and a rounded section. The flat linear section extends the entire width substantially at the center diameter of the connector 12, but just slightly away from the exact center so that the linear section of the other mating connector can be received. The linear portion forms the tabs 9 at the outer perimeter of the recessed face 19 of the connector 12.

The tangs 20, 22 each have a transverse cross-section that is substantially elongated and arcuate to extend along a portion of the outer perimeter of the recessed face 19 and project outward from the recessed face 19. The tangs 20, 22 have a first end that face and are separated from each other to form a first gap therebetween which exposes at least a portion of the screw 36. The tangs 20, 22 also have a second end that are separately from the tower frame 18 to form a second gap therebetween. The first tang 20 has a periphery 30 and the second tang 22 has a periphery 32, with each of the peripheries 30 and 32 defining interiorly facing profiles. The interiorly facing profiles of the tangs 20 and 22 fit flush against mating contours of the exteriorly disposed side profiles 29 of the tower frame 18 of the insert cap 17.

Two termini 34 of optical fibers are shown projecting outward from the recessed face 19 in the region between the insert cap tower 18 and respective ones of the two tangs 20 and 22. A head of a screw 36 is shown extending within the same region, between the two tangs 20, 22. The recess 28 is fitted with a screw and is provided for receiving a second retaining screw 36 of a mating one of the connectors 12. Two termini 34 of another connector can be received within respective ones of the apertures 24 when the connectors 12 are mated. The two retaining screws 36 are shown disposed at opposite sides of the face of the connector 12.

The profile 29 of the periphery 26 at the rounded section of the tower 18 of a first one of the connectors 12 has arcuately-shaped surfaces. The periphery 26 can optionally include tabs 26 that extend to the outer perimeter of the recessed face 19, whereas the arcuately-shaped surfaces are recessed inward from the outer perimeter of the recessed face 19 and are configured to matingly engage the profiles of the peripheries 30, 32 of respective ones of the tangs 20, 22 of the other of the connector 12. That aligns the apertures 24 in the insert cap 17 of the first one of the connectors 12 with the termini 34 disposed adjacent to the tangs 20 and 22 of the second one of the connectors 12 for optically coupling the optical fibers of the two mating connectors 12.

Thus, the mating portions of the profile 29 of the plug tower 18 define an exteriorly facing, arcuately shaped sidewall surfaces 26 which mate substantially flush with interiorly facing, arcuately shaped sidewall portions of the profiles of the tangs 20 and 22, with a sliding clearance therebetween to allow the connectors 12 to be engaged and disengaged. And, the profile 29 at the linear section of the tower 18 of a first one of the connectors 12 has a linear surface that is configured to matingly engage with the linear surface of the tower 18 of the other of the connector 12. The tabs 9 fit within the second gap formed between the second ends of the tangs 20, 22 and the linear section of the tower 18.

One or more bores or through-holes 8 can be formed in the insert cap 17. The bores 8 are formed at the rear end of the cap 17 and can extend at least partially into the insert cap 17 or, as shown, can extend through the entire cap 17 and even into the rear end of the tower 18. At the rear of the insert cap 17, the bores 8 receive the alignment pins 326, 327 (FIG. 10) of the insert body 164 to align the insert cap 17 with the insert body 164. The bores 8 can be sized differently to accept the differently sized alignment pins 326, 327. The bores 8 and pins 326, 327 cooperate to align and engage the insert cap 17 with the insert body 164.

FIG. 3 is a top view of the main body sleeve 42, in accordance with aspects of the present disclosure. The exterior periphery 46 of the sleeve 42 includes an annular-shaped protuberance which defines a rib 52 having an annular-shaped shoulder 53 which extends transverse to the longitudinal axis 40. A slot 54 extends through the annular-shaped rib 52 to provide a window for passing a stop pin through the rib 52, to selectively non-rotatingly couple the coupling sleeve 16 to the main body sleeve 42 when the coupling sleeve is disposed in a male position. Then, the stop may pass through the slot 54 to pass through the rib 52 for moving the sleeve 16 into a female position, rotatable upon the housing sleeve 42 for disposing the connector 12 in a female mode for coupling to a mating connector 12 disposed in a male mode. A gland 56 is defined in the exterior periphery 46 for receiving an O-ring seal element.

FIG. 4 is a longitudinal section view of the insert assembly 162, in accordance with aspects of the present disclosure. Four bores 188 (one shown) extend through the insert body 164 for receiving respective ones of the termini 34. The insert body bores 188 have longitudinal axes 186, which are parallel to the longitudinal axis 40. The rearward-most end of the bores 188 have a tapered surface 192, which widens in a rearward direction relative to the longitudinal axis 40. The forward face 196 of the retainer 166 provides an annular retainer shoulder for retaining one of the termini 34 within the insert assembly 162. Each of the termini 34 is passed through a respective one of the slots 198 and into a respective one of the insert body bores 188, and then four of the termini are inserted together into respective ones of the bores 188.

The insert cap 17 includes a number of bores 202 (one shown) for receiving various ones of the termini 34. A shoulder 204 is provided in the forward end of the insert cap bore 202 for retaining an alignment sleeve 212 within the bore 202 of the insert cap 17. The interiorly disposed surfaces of the insert cap bores 202 define interior profiles 208. Multiple fastener bores 210 (one shown) are provided for receiving the shanks 174 of the retaining screws 36. The insert cap bores 202 and the fastener bores 210 align with respective ones of the insert body bores 188 and fastener bores 172 of the insert body 164.

FIG. 5A is a longitudinal section view of one of the termini 34, in accordance with aspects of the present disclosure. The one of the termini 34 includes a pin body 216 and a ferrule 218. Each of the termini 34 has a longitudinal axis 220 which preferably extends substantially parallel to the longitudinal axis 40 of the connector 12 (shown in FIG. 1). The pin body 216 has a longitudinally extending bore 222 and a forwardly disposed counter bore 224, which are concentric with the longitudinal axis 220. The pin body 216 has a leading end 243, rear end and an intermediate portion therebetween. The leading end 243 includes an alignment surface 245A. A rib 244 extends outward from the leading end 243. The ferrule 218 is received in a counter bore 224 at the leading end 243 of the pin body 216, and extends forward from the leading end 243.

A retaining collar 230 is secured around an exterior surface 232 of the pin body 216. The retaining collar 230 is secured in the bore 188 of the insert body 164 by the termini retainer 166. The retaining collar 230 has an inner profile 234 defined by a tapered surface 236 and a tapered surface 238, which each taper toward the center of the retaining collar 230, such that the surface 236 and the surface 238 are wider at the outward ends. A protuberance 240 extends interiorly within the retaining collar 230, disposed between the tapered surface 236 and the tapered surface 238. The annular-shaped protuberance 240 defines an annular-shaped gimbal ring surface. The gimbal surface defined by the annular protuberance 240 extends inward and against the exterior periphery 232 of the pin body 216, such that the pin body 216 may be angularly displaced relative to the retaining collar 230, pivoting about the point of contact between the annular-shaped protuberance 240 and the pin body 216.

The bore 222 is sized for receiving an optical fiber and the cladding which extends around the core defined by the fiber. The ferrule 218 is rigidly secured in the forwardly disposed bore 224. An annular groove 226 extends into an exterior surface of the pin body 216 for receiving a retaining ring 228. The ferrule has a central bore 276 for receiving the core of the optical fiber. A coil spring 246 extends around the exterior of the pin body 216, between the forward end of the retaining collar 230 and a rearward end of a floating seal 252. The floating seal 252 includes an annular ring 253 and a floating collar 254 which slidably extend around over the pin body 216. The annular ring 253 is preferably a flat washer. In some embodiments, the annular ring 253 may be omitted, but is provided herein to prevent a spring 246 from jamming between the pin body 216 and the floating collar 254.

The floating collar 254 is annular-shaped, and preferably has a U-shaped cross-section and an interior bore 248 which may move longitudinally along the pin body 216, parallel to the longitudinal axis 220. The movement of the floating collar 254 in a direction transverse to the longitudinal axis 220 is limited by both a clearance fit between the interior bore 248 and the periphery of the pin body 216, and the clearance between the outside diameter of the floating collar 254 and the bore 188 of the insert body 164 (shown in FIG. 4). The collar 254 includes a rearwardly facing shoulder 256 and a cylindrical, exterior-facing seal surface 258. A forward face of the collar 254 defines a forwardly facing seal surface 260. A rearward facing shoulder of the annular-shaped rib 244 defines a seal surface 262.

An O-ring seal element 264 sealingly engages between the seal surface 258 and one of the interior bores 188 of the insert body 164 (shown in FIG. 4). An O-ring seal element 266 sealingly engages between the seal surface 260 and the seal surface 262. The width of a seal gland, which is defined by the distances between the seal surfaces 260 and 262, is determined by the length of an annular-shaped shoulder 265 of the pin body 216, which determines the squeeze applied to the O-ring seal element 266. The collar 254 is preferably sized to have a predetermined clearance fit with the bore 188 of the insert body 164 (shown in FIG. 4), such that it is free to move for only a limited distance in radial directions 268 with respect to, or transversely to, the longitudinal axis 186 of the bores 188 (shown in FIG. 4), as determined by the predetermined clearance between the bore 188 and the largest outer diameter of the collar 254. This limited distance determines the range of the squeeze applied to the O-ring 264, which seals between the bore 188 and the seal surface 258. The range of squeeze applied to the O-ring 264 determines the energization for the O-ring 264. The resilience of the O-ring 264, which is squeezed between the collar 254 and the bore 188, tends to center the floating collar 254 within the bore 188.

The spring 246 presses between the retaining collar 230 and the annular ring 253. The spring 246 presses the floating collar 254 against the O-ring 266, to squeeze the O-ring 266 between the seal surfaces 260 and 262, thereby providing a biasing means for energizing the O-ring seal element 266.

The forward end of the pin body 216 is free to move radially, transversely to the longitudinal axes 186 of the bores 188 in the directions 268 for distances determined by the clearance between the bore 248 of the floating collar 254 and the pin body 216. Thus, the pin body 216 and the annular shaped rib 244 thereof may be moved in the transverse directions 268 relative to the longitudinal axis 220, with the exterior of the pin body 216 pivoting about a pivot point defined by the protuberance 240 of the retaining collar 230. The seal surface 262 defined by the rib 244 will thus move transversely to the longitudinal axis 220 and relative to the forwardly facing seal surface 260 of the collar 254.

The ferrule 218 has a cylindrically shaped periphery 272 and includes a forward contact surface 274. In certain cases, the forward contact surface 274 may be angled with respect to the central bore 276 and the longitudinal axis 220 of the ferrule 218. For example, the forward contact surface 274 can be a polished surface having an eight-degree angle. Preferably, the angle of the forward contact surface 274 may be 6 to 11 degrees, although any suitable angle can be utilized. FIG. 5B is a longitudinal section view of the termini 34 illustrated in FIG. 5A rotated 90 degrees and illustrating the angled forward contact surface 274. As shown in FIG. 5B, forward contact surface 274 may preferably be a substantially planar surface and angled as compared to a plane that is perpendicular to the longitudinal axis 220. In certain embodiments, the forward contact surface 274 may be slightly rounded in a central region.

Angling the termini and fiber helps reduces the amount of optical signal that is reflected back into the central bore 276. The angled termini may introduce challenges to obtaining a proper complementary contact with another termini as a proper axial alignment and rotational alignment are needed to reduce transmission losses due to diffusion, reflection, and refraction of the light being transmitted from one optical fiber to another optical fiber.

To obtain the proper alignment, the termini 34 has a leading end 243 of the main pin body 216 and a rib 244 extending outward from a proximal end of the leading end 243. A portion 244A of the leading end 243 and/or rib 244 are flattened to form a flat alignment (or mating) surface 245, shown as a top portion of the leading end 243 and rib 244 in FIGS. 5-7. FIG. 6 is a forward view of the termini 34, in accordance with aspects of the present disclosure. FIG. 6 shows the flattened alignment surface 245 and rear wall 241 of raised rib portion 244B. Accordingly, the rib 244 includes a flattened rib portion 244A at a proximal end of the rib 244 and a raised portion 244B at the distal end of the rib 244 and in communication with and at a distal end of the flat rib portion 244A. The alignment surface 245 can be formed, for instance, along a top surface of the leading end 243 and the rib 244. It may be noted that the keyed surface 245 is shown formed from a portion of the leading end 243 and a portion of the rib 244 of the termini 34 to have a flat leading end alignment portion 245A and a flat rib alignment portion 245B continuous with the leading end alignment portion 245A. However, the keyed surface need not be provided at the leading end 243 and/or rib 244, but can be provided elsewhere, such as at the exterior surface 232 of the pin body 216 at the retaining collar 230.

FIG. 7A is a perspective view of the termini 34 and FIG. 7B is a is a longitudinal view of the termini 34, in accordance with aspects of the present disclosure. In the embodiment shown, the alignment surface 245 extends the length of the leading end 243 and into most of the rib 244 to define a rear wall 241 in the rib 244B. As shown, the leading end 243 and/or rib 244 are substantially circular, with flattened sections 245A, 245B forming the alignment surface 245, respectively. The alignment surface 245 is shown uniformly flat, though can be any suitable shape such as having a contoured surface, include one or more ribs or grooves, or another alignment feature that helps align with respective grooves or other alignment features in the cover portion 319.

Referring back to FIG. 4, in a ready-to-mate position, the spring forces the termini forward until the rib 244B contacts the inner mating edge 323 of the shoulder 206. In a mated position, shown in FIG. 4, the termini of the other connector pushes the termini 34 backward, forming a gap between the rib 244B and the inner lip of the shoulder 206.

Turning to FIG. 10, the shoulder 206 of FIG. 4 is shown in further detail. The shoulder 206 engages with the flat surface 245 of the termini of FIGS. 7A, 7B. More specifically, the insert body 164 includes a key or cover portion 319. The cover portion 319 extends at the forward end 313 of the insert body 164 and can be fabricated as an integral part of the forward end face 313 of the insert body 164.

The cover portion 319 has one or more ledges or shoulders 206 that extend inwardly from the perimeter of the forward end surface 313 to define linear alignment edges 323. In the embodiment of FIG. 10, a shoulder 206 extends inward from the top, bottom, left side, and right side. A notch 324 can be formed in one or more of the shoulders, and here a notch 324 is shown in the top and bottom shoulders 206 to permit access to a threaded opening 172. The notches 324 define lips 321 that include the alignment edges 323. An alignment edge 323 is provided at one or more of the bores 188 and extends at least partially over the bore 188 to partly block access to the bore 188.

Figure 11:
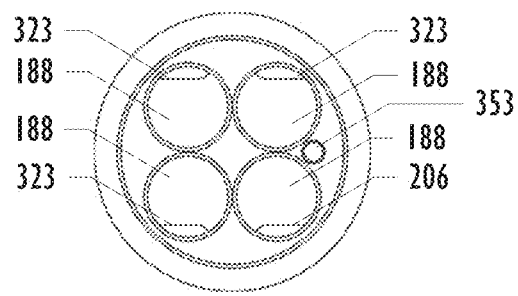
FIG. 11 is a rearward-end view of the insert body, in accordance with aspects of the present disclosure.

FIG. 11 is a rearward-end view of the insert body 164, and further illustrate that the four flat alignment edges 323 of the insert body 164 overlap into the bore holes 188 and engage a corresponding alignment surface 245 of the termini 34. In cases where the alignment surface includes sculpting, grooves, or is otherwise not flat, the four flat protuberances 314 include a suitably complementary shape. FIG. 11 also shows a pin 353 provided to align and engage the insert body with the terminus retainer plate.

The alignment edge 323 aligns and engages a respective alignment surface 245 of a termini 34 (FIG. 7) to ensure that the termini 34 is properly aligned in the bore 188. That, in turn ensures that the angled forward contact surface 274 (FIG. 5) of the termini 34 is properly aligned in the sleeve 212 (FIG. 8) to mate with the angled forward contact surface 274 of the termini 34 of the other connector 12 at the alignment plane 304.

In addition, a tab or shelf 325 can be formed in one or more of the shoulders 206, and here a tab 325 is shown in the left and right shoulders to permit pins 326, 327 to be formed thereon. The pins 326, 327 extend outward from the front surface of the shoulders 206. As noted above, the pins 326, 327 are received in respectively sized bores 8 of the insert cap 17 (FIG. 1A) to align and engage the insert cap 17 with the insert body 164. The retainers 244A, 244B diameters fit inside the bore 188 cavities and the flats 245 align with the flat edge 323 of the shoulder 206. The tabs 325 are positioned between the bores 188 so as not to obstruct the bores 188.

Accordingly, the shoulders 206 define a central opening 311 in the cover portion 319 that is generally square shaped, but with the notches 324 at the center of the top and bottom shoulders and the inward tabs 325 at the center of the left and right sides creating a curved configuration. The shoulders can be formed by multiple pieces or by fabrication of one single piece through various methods (machining, molding, assembly, additive manufacturing). The two threaded bores 172 are spaced around the central axis 40 and extend parallel to the central axis 40. Screws or fasteners are received in the bores 172 to secure the insert cap 17 to the insert body 164. The alignment pins 326, 327 can be press-fit into mounting holes that extend into the forward end face 313 of an insert body 164.

The termini 34 can be received in the insert body bore 188 via the opening 311 in the cover portion 319. The termini 34 may be positioned so that the alignment surface 245 of the termini 34 aligns with the alignment edge 323 of the cover portion 319. The alignment surface 245 and the alignment edge 323 cooperate to make sure that the forward contact surface 274 is properly aligned with the respective termini 34 to which the forward contact surface 274 is coupled. The alignment surface 245 and the alignment edge 323 prevent the termini 34 from rotating in the bore 188. In certain cases, a pin or protrusion can be inserted and fastened to the interior surface of the insert body 164 to create the alignment edge 323. In embodiments where the alignment surface 245 is not flat, the alignment edge 323 includes a suitably complementary shape to the alignment surface 245 or end pin.

Returning to FIG. 4, the bores 188 on the insert body 164 receive and sealingly engage the termini 34 features. And the integrated flat surface of the alignment edge 323 of the cover 319 of the insert body 164 orients the termini 34 so that the alignment surface 274 on the front of the termini 34 is oriented to and can be properly brought into contact with the alignment surface 274 of the other connector. An additional shoulder 206 can be provided at the rearward portion of the flat 314 that separates the flat protuberance 314 surface from the cylindrical surface preceding it to support a seal surface 262. Though the alignment surface 245 and top surface of the alignment edge 323 of the cover portion 319 are flat in one embodiment, those surfaces can have other shapes and sizes that matingly align with one another.

As noted above, the cover portion 319 is integrally formed at the end of the insert body 164. In an alternative embodiment of the disclosure, the cover 319 can be a separate element, such as a thin plate. The plate can be mounted to the leading end face of the insert body 164 or to the rear end face of the insert cap 17, such as by a fastener or adhesive. The plate can have the same configuration as the cover portion 319, including an alignment edge 323.

In one embodiment of the disclosure, one or more protuberances 314 can optionally be provided, in addition to or instead of the flat edges 323 of the cover portion or plate 319, for engaging the flat surfaces 345 of the termini. More specifically, the insert body 164 can have one or more protuberances 314 integrated along the ends of each of the bore holes (through multiple pieces or as part of one fabricated piece) into the insert body 164. One or more annular grooves or notches 214 can be formed at the proximal end of the insert cap 17, such as formed by a counterbore. The protuberances 314 are received in the grooves 214 and extend inward into the bore 202 of the insert cap 17 to engage with the flat surfaces 245 of the termini 34. The protuberance 314 can be a separate piece and coupled to the groove, and/or can be wedged between the groove and the leading end surface of the insert body 164. The protuberance 314 can be a single annular member, such as a ring or flat washer, or several members having an arcuate exterior perimeter and a flat interior perimeter. Still further, the protuberances 314 can be formed integrally with the insert cap 17 or the insert body 164, or can be attached to the insert body 164. The protuberances 314 have a flat top surface that engage the mating surface 245 of the termini 34.

FIG. 8 is a longitudinal section view of two of the termini 34 which are disposed in a coaxial and abutting alignment for transmitting light signals therebetween. Each of the optical fibers has terminal ends 302 which are aligned for transmitting light therebetween by engagement of respective ones of the ferrules 218 within the continuous alignment sleeve 212. The terminal ends 302 are aligned along a single plane of engagement, which is defined by an alignment of respective alignment planes 304 of the angle polished terminal ends 302. The alignment planes 304 fit flush against one another and the alignment planes 304 are at an angle to respective the longitudinal axes 220. In an embodiment, the mating planes extend nominally 8 degrees from transverse to respective planes of the longitudinal axes 220 of the termini.

Respective ones of the termini 34 may pivot within the annular engagement points 306 of the gimbal rings provided by the protuberances 240 of the retaining collars 230. The exterior peripheries of the retaining collars 230 fit within the bores 188 in a sliding engagement. The retaining collars 230 are retained within the bores 188 of the insert body 164 (shown in FIG. 4) by the annular shoulder defined by the forward face 196 of the terminus retainer 166 (shown in FIG. 4). The forward ends of respective ones of the termini 34 are held within the bores 188 of the insert body 164 (shown in FIG. 4) by the shoulders 270, which are defined by the forward ends of the annular-shaped ribs 244, engaging the rearward facing shoulder 206 (shown in FIG. 4). The termini 34 are gimbaled for pivoting relative to the contact points between the annular protuberances 240 of the retaining collars 230 and the exterior peripheries 232 of the pin bodies 216. The interior periphery of the alignment sleeve 212 mates with the exterior peripheries of the ferrules 218 of the termini 34, in a slight clearance fit which extends around the circumference of the ferrules 218 and along the lengths of the ferrules 218 and the alignment sleeve 212, which extend parallel to the longitudinal axis 220.

Referring back to FIG. 8, the angle polished terminal ends 302 of the forward ends of respective ones of the termini 34 are held slidingly within the sleeve 212. But the termini 34 are rotationally constrained by the combination of the bores 188 (FIG. 4) within the insert body 164 and flat features at the forward end 313 of the insert body 164, such as flat top surface of the protuberance 314 and/or insert cap 17. The terminus 34 is limited in axial movement by the bores 188 in the insert body 164 and respective engaged features of the terminus and is constrained rotationally by the flat surface 323 of the insert body and/or the flat top surface of the protuberance 314 on the insert body and the respective alignment surface 245 and angle polished terminal ends 302 features on the forward end of the angle physical contact terminus.

FIG. 9 is a longitudinal section view of the alignment sleeve 212, in accordance with aspects of the present disclosure. The alignment sleeve 212 has a continuous, solid tubular body 280 which is preferably made of a rigid ceramic material, such as zirconia. In the preferred embodiment, the tubular body 280 is substantially cylindrical and has a central axis 282. The alignment sleeve has a bore 284 which has an interior profile 286 for mating with the peripheries 272 of two of the ferrules 218, over the lengths of the ferrules 218 and the sleeve 212, for aligning the two ferrules 218 together for transmitting light between optical fibers disposed in the bores 276 of the two ferrules 218. The exterior periphery 288 is provided for mating with the profile 208 of a respective one of the four bores 202 of the insert cap 17.

In one embodiment, the profile 286 of the alignment sleeve 212 and the periphery 272 of the ferrule 218 are cylindrical, but in other embodiments may be other mating shapes for aligning the ferrules 218 of abutting ones of the termini 34 for transmitting light therebetween. Similarly, the exterior periphery 288 of the alignment sleeve 212 and the profile 208 of the bores 202 which extend through the insert cap 17 (shown in FIG. 4) are also preferably substantially cylindrical, but may also be provided with other mating shapes for aligning and retaining the alignment sleeves 212 relative to the bores 202 of the insert cap 17. The ends 290 and 292 of the bores 284 are beveled to guide contact surfaces 274 of the terminal ends of the termini 34 into respective ones of the bores 284.

In one embodiment, a cross-section of the tubular body 280 of the sleeve 212 is continuous, such that the tubular body 280 does not having either longitudinal or circumferential splits extending in the body 280, wherein the periphery of tubular body 280 extends continuously around the longitudinal axis thereof. Thus, the continuous, ceramic, tubular body 280 of the alignment sleeve 212 is rigid, and will not easily expand or contract, exclusive of the elasticity of the material from which the alignment sleeve 212 is made, due to forces applied transverse to the central, longitudinal axis 282 of the interior bore 284 by the ferrules 218, or by static or shock forces applied transverse to the ferrules 218, as would prior art spring-type alignment sleeves having longitudinally extending slits in the sidewalls. That is, other than the elastic limits of the ceramic material from which the alignment sleeve 212 is made, the solid sleeve 212 will not expand as would a split sleeve.

As noted above, FIG. 10 is a forward-end view of the angle physical contact terminus insert body 164, in accordance with aspects of the present disclosure. The termini orienting flat features are shown symmetric about the longitudinal axis 40. The insert body 164 includes a flat 184 formed into the top of the insert body 164 that extends parallel to the longitudinal axis 40 to provide a keyway. As shown, the insert body 164 includes multiple bores 188 spaced apart an equal distance around a central axis 40 and extend parallel to the central axis 40.

In certain cases, the alignment surface 245 can be provided elsewhere along the termini 34. For example, in reference to FIG. 5A, the retaining collar 230 may include a sculpted surface that engages a complementary surface along the termini retainer 166. As another example, the pin body 216 may include a flattened or otherwise sculpted surface along the top surface of the termini 34 between the retaining collar 230 and the retaining ring 228, to which a complementary surface of the termini retainer 166 may engage.

Figure 12:
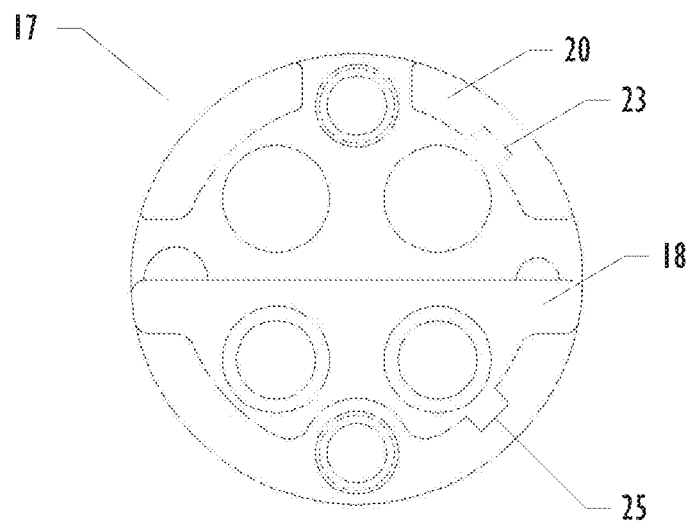
FIG. 12 is a forward view of the insert cap 17 with keying features, in accordance with aspects of the present disclosure.

Turning to FIG. 12, another embodiment of the disclosure is shown. Here, the forward end of the insert cap 17 provides a hermaphroditic configuration for coupling with a mating connector 12. The insert cap 17 is similar to the one shown in FIGS. 2A, 2B. However, an added keying feature, here shown as a notch 23, is provided in at least one of the tangs 20. And a counterpart keying feature, here shown as a projection or tab 25, is provided in the outer profile 29 of the periphery 26 at the rounded section of the tower 18. The notch 23 and projection 25 have mating sizes and shapes, shown here as generally square or rectangular, though any suitable size and shape can be utilized. The keying features 23, 25 provide further alignment and engagement between the insert caps 17 of two mating connectors 12. In addition, other suitable keying features can be provided elsewhere on the insert cap 17.

It is noted that the description and claims use several geometric or relational terms, such as linear, arcuate, elongated, parallel, perpendicular, concentric, and flat. In addition, the description and claims use several directional or positioning terms and the like, such as upper, lower, top, bottom, left, right, inward, interior, and outward. Those terms are merely for convenience to facilitate the description based on the embodiments shown in the figures. Those terms are not intended to limit the disclosure. Thus, it should be recognized that the disclosure can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the disclosure.

Modifications are possible in the described embodiments, and other embodiments are possible, within the scope of the claims.

The invention claimed is:

1. A fiber optic cable connector for a terminal end of a fiber optic cable having at least one optical fiber, the connector comprising:
    a terminus receiving the optical fiber, said terminus having a body with an exterior surface;
    an insert body with an interior passage disposed therein for receiving the terminus end of the at least one optical fiber of said fiber optic cable;
    a first alignment plane of said terminus aligning the terminal end of the at least one optical fiber; and
    a shoulder disposed at said interior passage of said insert body and extending inward transverse to a longitudinal axis of said interior passage for retaining said terminus within said passage with said terminus aligned with the first alignment plane, said shoulder having a linear alignment edge that is parallel to a longitudinal axis of the interior passage of the insert body and engages with and aligns the exterior surface of said terminus,
    wherein said terminus body has a leading end, a rib extending outward from the leading end and with a first end surface and a second opposing end surface that is parallel to the first end surface, and a wall surface being between the first and second end surfaces of the rib along a longitudinal axis of the rib and being perpendicular to the longitudinal axis of the rib.

2. The fiber optic cable connector of claim 1, wherein the first alignment plane and second alignment plane have a 6 to 11 degree angle with respect to the longitudinal axis of said interior passage.

3. The fiber optic cable connector of claim 1, wherein said linear alignment edge of said shoulder engaging a flat portion of the exterior surface of said terminus.

4. The fiber optic cable connector of claim 1, further comprising a sleeve receiving said terminus parallel to said longitudinal axis of said terminus.

5. The fiber optic cable connector of claim 1, further comprising a terminal end of said terminus, wherein said terminal end angularly moves transverse to respective ones of said longitudinal axis thereof, but is rotationally constrained by a flat protuberance on the insert body and a flat edge of terminus.

6. The fiber optic cable connector of claim 1, further comprising a protuberance extending around said terminus to gimbal said terminus within said interior passage, wherein said terminal end of said terminus angularly moves transverse to said longitudinal axis thereof, pivoting about protuberance.

7. The fiber optic cable connector of claim 1, further comprising a floating collar which extends around said terminus with a clearance fit between said floating collar and said terminus such that said floating collar is free to move parallel to the longitudinal axis of said terminus.

8. The fiber optic cable connector of claim 7, further comprising a first seal element disposed within respective ones of a first seal gland, and sealingly engaging between said terminus and said floating collar, said floating collar having a seal face which extends parallel to said longitudinal axis of said terminus, spaced apart from said interior passage to define a second seal gland therebetween.

9. The fiber optic cable connector of claim 8, further comprising a second seal element disposed in said second seal gland, extending around said longitudinal axis of said terminus, and sealingly engaging said seal face and said interior passage when said terminus are angularly displaced about said protuberance, and a biasing means to energize said second seal element.

10. The fiber optic cable connector of claim 1, further comprising a housing at least partially enclosing said terminus and said insert body.

11. The fiber optic cable connector of claim 1, further comprising an insert cap coupled with said insert body, said insert cap having a leading mating end with a recessed face, a tower and one or more tangs which extend forward from said recessed face, wherein said one or more tangs and said tower are spaced apart in a keyed arrangement for reciprocally engaging another tower and another one or more tangs of another connector.

12. A method for joining two fiber optic cables having termini of respective ones of multiple optical fibers included within said cables, the method comprising:
    receiving at a housing having an insert body with an interior passage disposed therein, one of the termini of the optical fibers of one of the cables;
    aligning a first alignment plane with a second alignment plane of a second housing for transmitting light signals therebetween;
    retaining at a shoulder disposed to extend substantially transverse to a longitudinal axis of the interior passage, the terminus within the interior passage, the terminus having a flat surface; and
    mating ones of said termini fit within opposite ends of respective ones of a mating sleeve to align a terminal end of said mating ones of said termini for transmitting light signals therebetween,
    wherein said shoulder has a linear alignment edge that is parallel to a longitudinal axis of the interior passage of the insert body and engages with and aligns the flat surface of said terminus,
    wherein said terminus body has a leading end, a rib extending outward from the leading end and with a first end surface and a second opposing end surface that is parallel to the first end surface, and a wall surface being between the first and second end surfaces of the rib along a longitudinal axis of the rib and being perpendicular to the longitudinal axis of the rib.

13. The fiber optic cable connector of claim 1, wherein:
    the exterior surface forms a flat alignment surface at a front of the body; and the interior passage of said insert body forms a bore receiving the body of said terminus, the insert body has a forward face with the shoulder, and the shoulder partially obstructs the bore and aligns with the flat alignment surface of the body of said terminus to properly align the terminal end of the received fiber optic cable at the first alignment plane.

14. The connector of claim 13, wherein the terminal end of the received fiber optic cable is angled, further comprising a sleeve receiving said terminus, the flat alignment surface and the shoulder aligning the angled terminal end within said sleeve.

15. The fiber optic cable connector of claim 1, the connector further comprising:
an insert cap extending forward from a leading end of said insert body and receiving at least a portion of said terminus body; wherein the leading end has an alignment plane, and said insert body has a leading end.

16. The connector of claim 15, wherein the exterior surface of said terminus body has a flat alignment surface; said shoulder engaging the flat alignment surface of said terminus body.

17. The connector of claim 16, wherein said shoulder has a flat edge, said flat edge engages the flat alignment surface of said terminus body.

18. The connector of claim 16, wherein the leading end has a flat leading end alignment surface extending along a portion of the leading end, said flat leading end alignment surface forming said flat alignment surface.

19. The connector of claim 18, wherein said rib has a flat rib alignment surface extending along a portion of said rib, said flat rib alignment surface is continuous with said flat leading end alignment surface, and said flat rib alignment surface and said flat leading end alignment surface form said flat alignment surface.

20. The connector of claim 19, wherein said rib has a proximal end and a distal end, said flat rib alignment surface is formed at the proximal end of said rib, and a raised portion is formed at the distal end of said rib and has the wall surface in communication with the flat rib alignment surface.

21. The connector of claim 1, wherein:
the terminus is a first terminus, and couples to a second terminus, and
the first alignment plane of the first terminus aligns with a second alignment plane of at least one optical fiber of the second terminus for transmitting light signals therebetween.

* * * * *